July 31, 1962    R. E. DAVIS, SR., ET AL    3,046,573
REVERSIBLE AUTOMOBILE ARM REST PILLOW
Filed Dec. 14, 1960
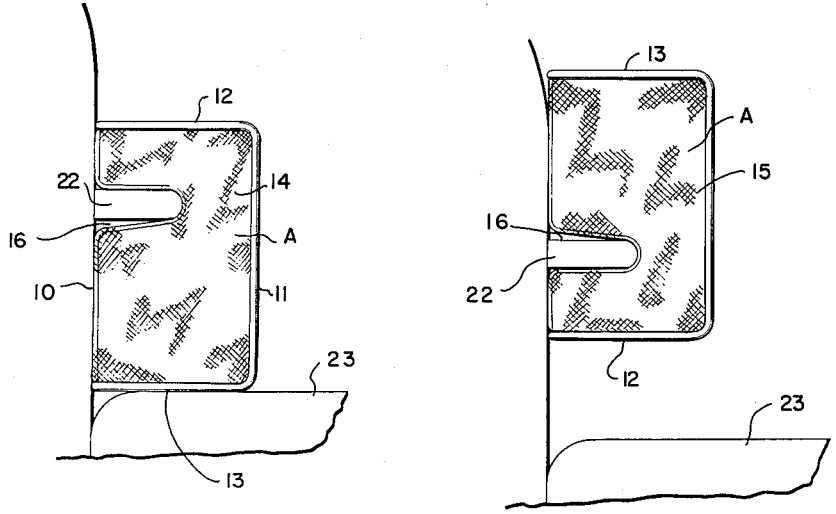
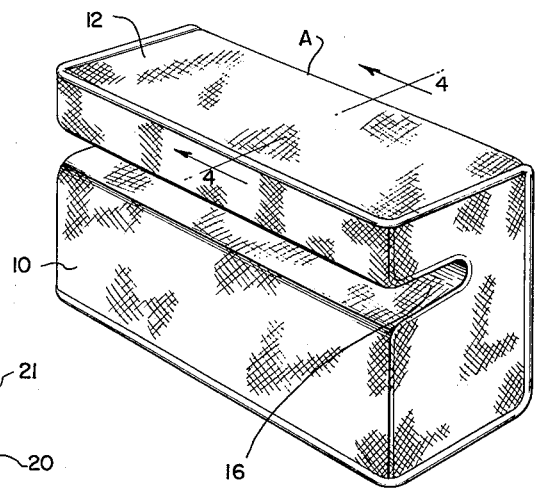
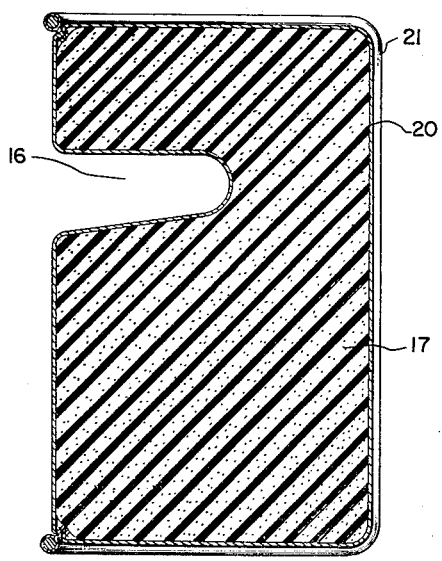
INVENTORS
ROBERT E. DAVIS SR.
ROBERT E. DAVIS JR.
BY Burns, Doane and Benedict
ATTORNEYS 3,046,573
REVERSIBLE AUTOMOBILE ARM REST PILLOW
Robert E. Davis, Sr., and Robert E. Davis, Jr., both %
Southland Sox Company, Fort Payne, Ala.
Filed Dec. 14, 1960, Ser. No. 75,840
1 Claim. (Cl. 5—337)

This invention relates to a removable reversible pillow for application to the conventional arm rest carried by the door of an automobile.

Many elderly drivers particularly find that the conventional arm rest on the automobile door is wholly inadequate to provide comfortable cushioning for the forearm of a passenger or driver of the vehicle. Additionally the height of the passenger frequently renders the conventional arm rest of substantially no use whatever in supporting the forearm of the passenger or driver.

It is an object of the present invention to provide a removable reversible pillow for selective application to a conventional automobile arm rest to selectively provide a forearm cushion at two selected elevations and which will additionally provide a side cushion for the automobile passenger or driver. More specifically it is an object of the invention to provide a pillow for use on an arm rest of an automobile door embracing a six-sided cushion whose sides are quadrangular and having a greater height and width with a channel extending from end to end of the cushion along one of its longer sides so located that opposite top and bottom faces of the cushion may be alternated and positioned in different elevations with respect to the arm rest and seat of an automobile. Further more detailed objects and advantages of the invention will become apparent as the description proceeds, which will be given in connection with the accompanying drawings wherein:

FIGURE 1 is an end elevation of the removable reversible pillow illustrating the same applied to an automobile arm rest with the supporting surface of the pillow in a lower position.

FIGURE 2 is an end elevation of the pillow of the invention illustrating the same applied to an arm rest in a manner to position the supporting surface at a higher elevation.

FIGURE 3 is a perspective view of the pillow showing the same disassociated from the arm rest.

FIGURE 4 is a cross-sectional view along the line 4—4 of FIGURE 3.

Referring to the drawings, the removable reversible pillow, indicated generally at A, has six sides which may be grouped in pairs as follows: Opposed sides 10 and 11, which give the vertical dimension to pillow A in use; opposed sides 12 and 13, each of which provides alternately a top or a bottom surface for the pillow when in use; and, opposed sides 14 and 15, which constitute the opposite ends of the pillow.

It will be observed that the pair of opposed sides 10 and 11 and the pair of opposed sides 12 and 13 are of equal length in the longitudinal dimension of the pillow and that these pairs of sides, respectively, define the vertical and transverse dimensions of the pillow A. The opposed faces 14 and 15, which constitute the ends of the pillow, are of a length in the transverse dimension of the pillow, which approximates one-half the length of the pair of opposed faces 10 and 12 and the pair of opposed faces 12 and 13.

There is formed in the face 10 of the pillow A a channel 16 extending from end to end of the pillow A. The channel 16 has a depth substantially one-half of the transverse dimension of the pillow A. The vertical center of the channel 16 is positioned approximately two times the distance from the face 13 of the pillow as it is from the face 12 of the pillow.

In the preferred embodiment the pillow embraces the inner cushion 17 of resilient homogeneous material, such as foam rubber or the like, from which the longitudinal extending channel 16 has been cut. The cushion 17 is incased in a fabric or plastic cover 20, which may have a suitable piping bead 21 extending along the exposed edges of the pillow when applied to an arm rest.

The pillow A, as applied in FIGURE 1, has its channel 16 embracing a more or less conventional arm rest 22 with the face 12 disposed as the top or forearm receiving surface of the pillow. Inasmuch as the face 12 is only about one-half the distance from the vertical center of the channel 16 as is the face 13 of the pillow, it will be observed that in the position of application of the pillow A, as shown in FIGURE 1, the forearm receiving surface 12 is considerably lower than when the pillow is applied in reverse position as shown in FIGURE 2. In FIGURE 2 the pillow is inverted from the position shown in FIGURE 1 with the channel 16 embracing the conventional arm rest 22 with the face 13 positioned as the forearm receiving surface at a substantially higher elevation with respect to the seat 23 than is the case of the forearm receiving surface 12 in the position of application of the pillow A illustrated in FIGURE 1.

The body of the passenger or driver who is seated upon the seat 23 acts to wedge the pillow A into firm position with the channel 16 embracing the conventional arm rest 22 in either the position of application shown in FIGURE 1 or the position of application shown in FIGURE 2. The pillow A not only provides a restful cushion for the forearm of the passenger but additionally provides side cushioning against lateral swinging of the passenger when rounding curves and the like. A tall passenger or driver may prefer to position the pillow A in a manner to employ the face 13 as the forearm receiving surface at the higher elevation from the seat 13, as illustrated in FIGURE 2, whereas a shorter passenger may prefer to employ the face 12 as the forearm receiving surface in the lower elevation with respect to the seat 23 provided through the application of the pillow A in the manner illustrated in FIGURE 1.

The reversible removable pillow for application to an arm rest of an automobile representing the present invention can be economically fabricated and supplied in a variety of colors to harmonize with the interior of the automobile finish. The pillow is removable and quite universally applicable to conventional arm rests mounted on the doors of automobiles. The pillow of the present invention forms, of course, no permanent part of the upholstery of the automobile and may be applied at will in either of its reverse positions by the passenger or driver of the car.

Having thus described our invention, what we claim is:

A pillow for use on a padded arm rest of an automobile door comprising a six-sided removable and reversible cushion comprised of a resilient material, all of said sides being quadrangular, two pairs of opposed sides being of substantially equal length and approximately two times as long in the longitudinal dimension of the pillow as the third pair of opposed sides in the transverse dimension of the pillow, the height of said cushion having a dimension intermediate the length of said two pairs of opposed sides and said third pair of opposed sides to provide alternate elongated quadrangular top and bottom surfaces for said cushion, a channel extending from end to end of said cushion along one of its longer sides connecting said alternate faces, said channel having a depth equal to about one-half of said third pair of opposed sides and a width lying within the limits of from about one-third to about one-sixth of the height of said cushion, said channel being disposed nearer one of said alternate faces of said cushion than to the other alternate face thereof, all of said sides and said channel being covered by fabric, said pillow adapted to be positioned with said channel removably embracing an arm rest with either alternate top and bottom surface disposed above the arm rest.

References Cited in the file of this patent
UNITED STATES PATENTS 1,856,868   Fry _____ Mar. 3, 1932